UNITED STATES PATENT OFFICE.

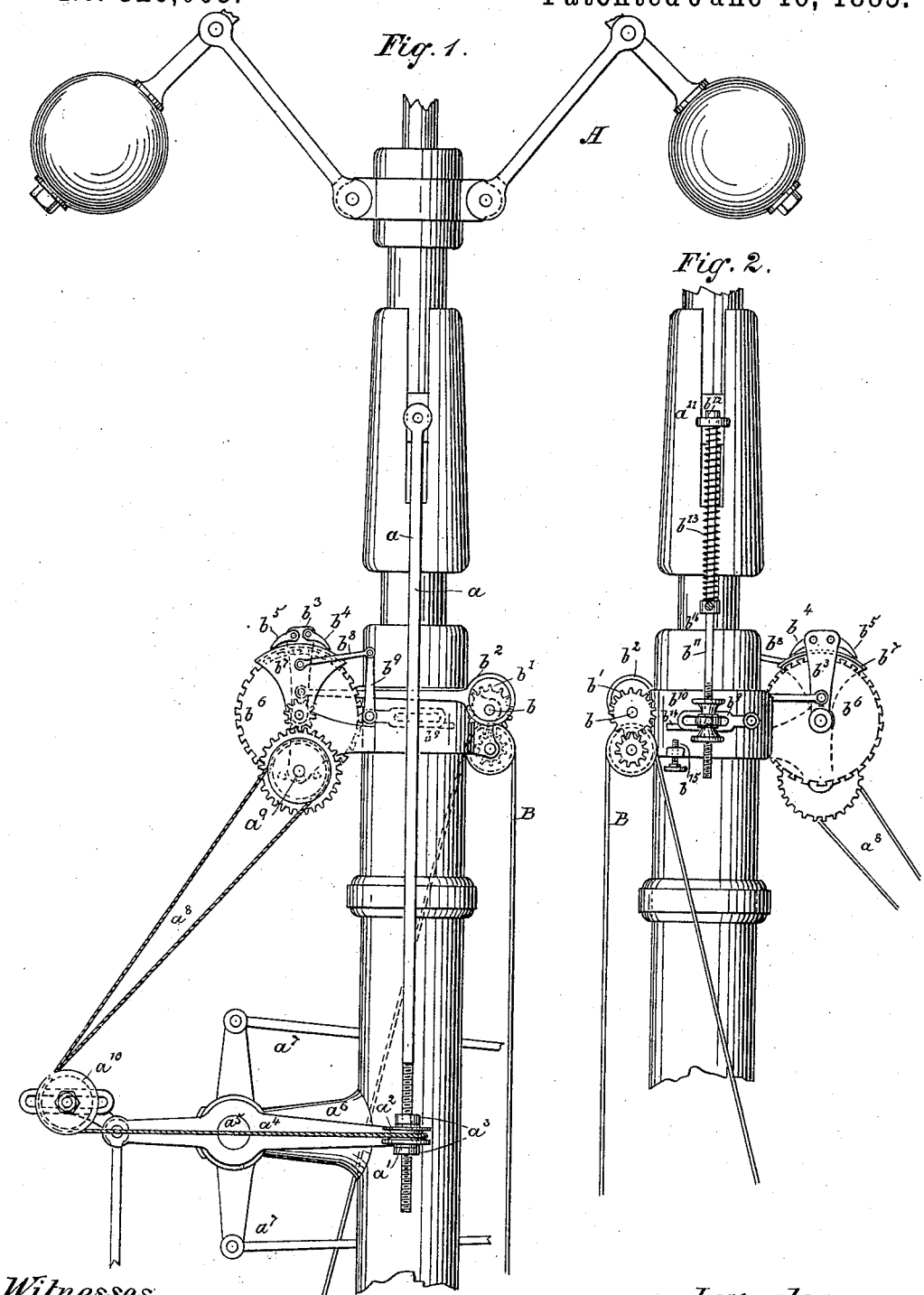

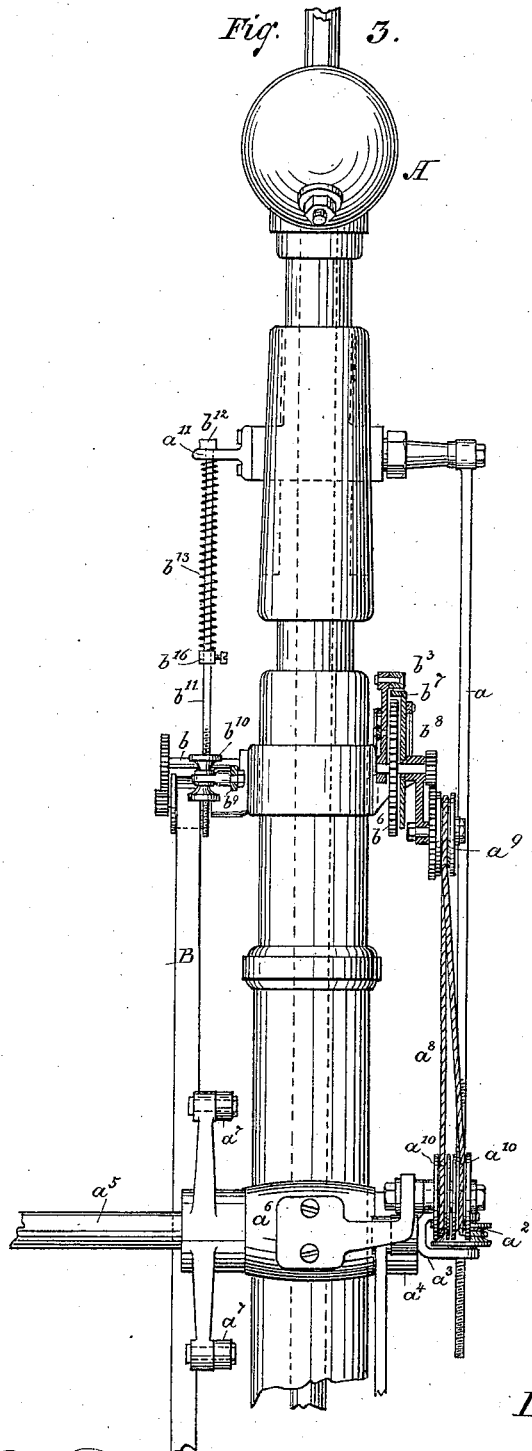

JOHN SCOTT, OF WILLIMANTIC, CONNECTICUT.

GOVERNOR.

SPECIFICATION forming part of Letters Patent No. 320,005, dated June 16, 1885.

Application filed November 14, 1884. (No model.)

*To all whom it may concern:*

Be it known that I, JOHN SCOTT, a citizen of the United States, and a resident of Willimantic, in the county of Windham and State of Connecticut, have invented certain new and useful Improvements in Governors for Regulating the Supply of Steam or Water, and thereby the speed of steam-engines, water-wheels, and similar machines, of which the following is a specification.

The object of my invention is to increase the distance and quickness of the action upon the valves of the centrifugal or ball governor; and it consists of such mechanism as shall multiply or increase the extent of the movement of the valves caused by any change of the elevation of the governor-balls, as shown in the accompanying drawings, of which—

Figure 1 is a view in elevation of one form of my invention as at work. Fig. 2 is a view in elevation of the opposite side of a portion of Fig. 1. Fig. 3 is also a view in elevation of, but taken at right angles to, Fig. 1, and having some of the frame-work broken away, showing details.

Like letters refer to like parts throughout.

The nature of my invention is such that the rising and falling movement of the governor-balls, due to changes of velocity of rotation, shall not only cause an opening or closing movement of the valves or gate, but that such opening or closing movement of the valves shall be an accelerating motion. Thus, if the governor-balls drop a given distance—say, one inch—the second half inch taking the same time as the first half inch, the action of the second half of the drop shall be greater upon the valves than that of the first half; or if the governor-balls drop or rise from one level to another and remain there, as from change of steam-pressure or load, the action of the governor in opening or closing the valves will not stop at the point attained when the change of elevation was complete, but will continue throwing the valves farther and farther as long as the governor remains out of its regular running level, thus insuring an exceptionally quick and effective change of the supply of steam or water and correspondingly quick return to the regular running speed, which by restoring the governor to its proper level retains the valves in the new position proper for such change of steam-pressure or load upon the engine, as aforesaid.

To attain this end I make use of the ball-governor A, of the usual form. To this governor is attached the valve rod or connection $a$. The lower end of this rod $a$ has a screw-thread cut thereon, and is supplied with the nut $a'$, which has a pulley, $a^2$, by which it may be turned, and is carried by a swivel or flexible joint, $a^3$, on the end of a lever, $a^4$. The lever $a^4$ is connected to the valve-connections by the rock-shaft $a^5$, which works in a journal, $a^6$, in the frame. It is manifest that by turning the nut $a'$ the length of the rod $a$ and the action of the governor A upon the valves through the lever $a^4$ and connection $a^7$ are immediately and correspondingly affected.

To turn the nut $a'$ a belt, $a^8$, is provided, which transmits the power from another pulley, $a^9$. Leading-pulleys $a^{10}$ $a^{10}$ are provided near the center line of the rock-shaft $a^5$, which guide the belt $a^8$ fair between the pulleys $a^2$ and $a^9$, whatever the position of the lever $a^4$.

The power to actuate the pulley $a^9$ is derived by means of a belt, B, from any continuously-rotating part of the machinery or from the stem of the governor A, as most convenient. The belt B imparts motion to a shaft, $b$, upon which is an eccentric or cam, $b'$, which reduces the continuously-rotative motion of the shaft $b$ to a vibrating movement of a strap and connection, $b^2$, which in turn causes an arm, $b^3$, to vibrate.

Upon the arm $b^3$ are two pawls, $b^4$ $b^5$, which engage the teeth or detents of a wheel, $b^6$. The pawls $b^4$ $b^5$ are set to operate both ways, and if both are allowed to operate at each vibration of the arm $b^3$ they would simply cause a vibratory movement of the wheel $b^6$. To prevent this and allow either of the pawls $b^4$ $b^5$ to operate alone, and thereby cause an extended rotation of the wheel $b^6$, which in turn drives the pulley $a^9$ and its connections, as described, a guard-plate, $b^7$, is made to swing concentric with the wheel $b^6$. The outer edge of $b^7$ is made circular, and of such radial length that when located in the path of the pawls $b^4$ $b^5$ it will hold the same clear of the wheel $b^6$, rendering them inoperative, but when swung to either side it will permit one pawl to operate and will hold the other clear. The guard-plate $b^7$ is connected by means of a connection, $b^8$, lever and rock-shaft $b^9$, a swivel-nut, $b^{10}$, and rod or connection $b^{11}$, to the governor A in such a way that any change of level of the balls of the governor will cause a corresponding movement of the guard-plate $b^7$ and permit one or the other of the pawls $b^4$ or $b^5$ to engage the wheel $b^6$, which, by the means already described, will cause the rotation of the nut $a'$ and consequent change of the working length of the rod $a$, thus increasing and accelerating the action of the governor A upon the valves. When the balls of the governor A resume their proper running level, as their velocity is again reduced to its normal rate, the plate $b^7$ again covers the pawls $b^4$ $b^5$, and the wheel $b^6$ stops, holding the rod $a$ at the changed length, corresponding to the change of steam-pressure or load upon the engine. When the engine is stopped, the governor A drops below its running level, and to permit such drop without breaking or disarranging the parts described, the rod or connection $b^{11}$ is made to pass through a hole or loop, $a^{11}$, in the slide of the governor, and the upper end of the connection $b^{11}$ is provided with a head, $b^{12}$, so that the upward movement of A will lift the rod $b^{11}$. A spring, $b^{13}$, is so placed upon $b^{11}$ that the downward movement of A shall depress the spring and with it the rod $b^{11}$ in working; but if A falls below the working position a guard or lug, $b^{14}$, upon the lever $b^9$, resting upon an adjustable stop, $b^{15}$, provided in the frame, holds the lever $b^9$ and rod $b^{11}$, while the yielding of the spring $b^{13}$ permits the governor A to fall to its position at rest. An adjustable stop or collar, $b^{16}$, is provided upon $b^{11}$, whereby the tension of the spring $b^{13}$ may be regulated as required.

My invention, as described, prevents jars or shocks, no matter how suddenly the load upon the engine or the steam-pressure may be changed, and constitutes a very sensitive and efficient device for regulating engines where it is of the first importance to keep them at all times at the same uniform velocity.

What I claim, and desire to secure by Letters Patent, is—

1. In a governor for steam-engines, the combination of the governor A, rod $a$, nut $a'$, lever $a^4$, and valve connections $a^7$, with the pulleys $a^2$ $a^{10}$ $a^9$, and the belt $a^8$, when the belt $a^8$ is caused to turn the nut $a'$ by power or mechanism that is put in action and controlled by the change of elevation of the governor A, substantially as herein shown and set forth.

2. In a governor for steam-engines, the nut $a'$, pulleys $a^2$ $a^9$, and belt $a^8$, in combination with and actuated by the ratchet-wheel $b^6$, arm $b^3$, pawls $b^4$ $b^5$, connection $b^2$, eccentric $b'$, pulley $b$, and belt B, when the action of the pawls $b^4$ $b^5$ is limited and controlled by mechanism directly connected with and operated by the governor A, rod-connection $b^8$, lever $b^9$, swivel-nut $b^{10}$, rod $b^{11}$, and guard-plate $b^7$, as herein shown and described.

3. In a governor for steam-engines, the connection $b^{11}$, having a head, $b^{12}$, spring $b^{13}$, and adjustable stop $b^{16}$, in combination with the governor A, and guard $b^{14}$ and adjustable stop $b^{15}$, when constructed and operated substantially as herein shown and set forth.

4. In a governor for steam-engines, the nut $a'$, turned and controlled by mechanism regulated by the governor, in combination with the rod $a$, operated by the governor, lever $a^4$, rock-shaft lever, and valve connections $a^7$, substantially as and for the purposes herein shown and set forth.

Signed at Willimantic, in the county of Windham and State of Connecticut, this 12th day of November, A. D. 1884.

JOHN SCOTT.

Witnesses:
N. D. WEBSTER,
H. C. LATHROP.